(12) United States Patent
Sato et al.

(10) Patent No.: US 10,027,370 B2
(45) Date of Patent: Jul. 17, 2018

(54) TRANSMISSION APPARATUS, RECEPTION APPARATUS, AND INFORMATION PROCESSING METHOD

(71) Applicant: SONY CORPORATION, Tokyo (JP)

(72) Inventors: Masanori Sato, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/119,410

(22) PCT Filed: Jan. 28, 2015

(86) PCT No.: PCT/JP2015/052314
§ 371 (c)(1),
(2) Date: Aug. 17, 2016

(87) PCT Pub. No.: WO2015/129375
PCT Pub. Date: Sep. 3, 2015

(65) Prior Publication Data
US 2017/0070259 A1    Mar. 9, 2017

(30) Foreign Application Priority Data
Feb. 26, 2014   (JP) ................................ 2014-035207

(51) Int. Cl.
*H04B 1/707*   (2011.01)
*H04J 11/00*   (2006.01)
(Continued)

(52) U.S. Cl.
CPC .......... *H04B 1/707* (2013.01); *H04J 11/0079* (2013.01); *H04J 13/0048* (2013.01); *H04J 13/16* (2013.01)

(58) Field of Classification Search
CPC ....... H04B 1/707; H04B 1/69; H04J 13/0048; H04J 13/16
See application file for complete search history.

(56) References Cited

U.S. PATENT DOCUMENTS 8,175,134 B1 * 5/2012 Giallorenzi ............ H04B 1/692
375/132
9,537,677 B2 * 1/2017 Hines ...................... H04L 25/02
(Continued)

FOREIGN PATENT DOCUMENTS

JP   01-295540 A   11/1989
JP   11-252044 A   9/1999
(Continued)

*Primary Examiner* — Wutchung Chu
(74) *Attorney, Agent, or Firm* — Oblon, McClelland, Maier & Neustadt, L.L.P.

(57) ABSTRACT

[Object] To provide a transmission apparatus, reception apparatus, and information processing method which enable a wireless device to carry out wireless transmission with less power consumption. [Solution] A transmission apparatus includes: a communication unit configured to transmit a transmission signal from the transmission apparatus to a reception apparatus via wireless communication; and a signal processing unit configured to generate the transmission signal in which transmission information is spread by using a spreading code selected according to identification information of the transmission apparatus, in order to enable the reception apparatus to acquire the identification information on the basis of an estimation result of the spreading code used for the transmission signal.

11 Claims, 12 Drawing Sheets

(51) Int. Cl.
*H04J 13/00* (2011.01)
*H04J 13/16* (2011.01)

(56) References Cited

U.S. PATENT DOCUMENTS

| | | | | |
|---|---|---|---|---|
| 2005/0088960 | A1* | 4/2005 | Suh | H04L 5/026 |
| | | | | 370/208 |
| 2005/0226141 | A1* | 10/2005 | Ro | H04B 1/69 |
| | | | | 370/203 |
| 2008/0043712 | A1* | 2/2008 | Hart | H04B 7/15507 |
| | | | | 370/348 |
| 2009/0010641 | A1* | 1/2009 | Li | H04B 10/0775 |
| | | | | 398/9 |
| 2011/0310935 | A1* | 12/2011 | Hadef | H04B 1/7075 |
| | | | | 375/150 |
| 2012/0170482 | A1* | 7/2012 | Hwang | H04B 13/005 |
| | | | | 370/252 |
| 2016/0182189 | A1* | 6/2016 | Stadali | H04L 1/0003 |
| | | | | 370/474 |

FOREIGN PATENT DOCUMENTS

| | | |
|---|---|---|
| JP | 2000-354021 A | 12/2000 |
| JP | 2002-215840 A | 8/2002 |
| JP | 2012-199666 A | 10/2012 |

\* cited by examiner

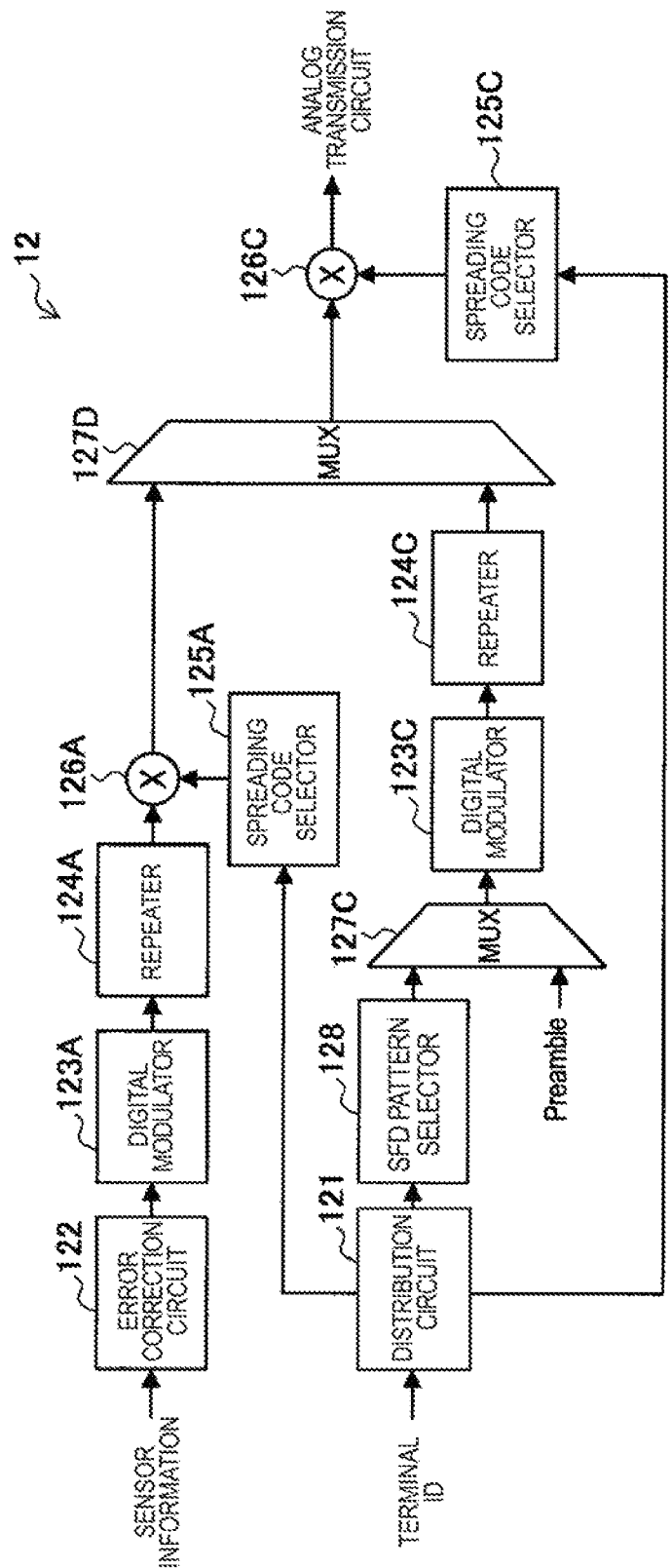

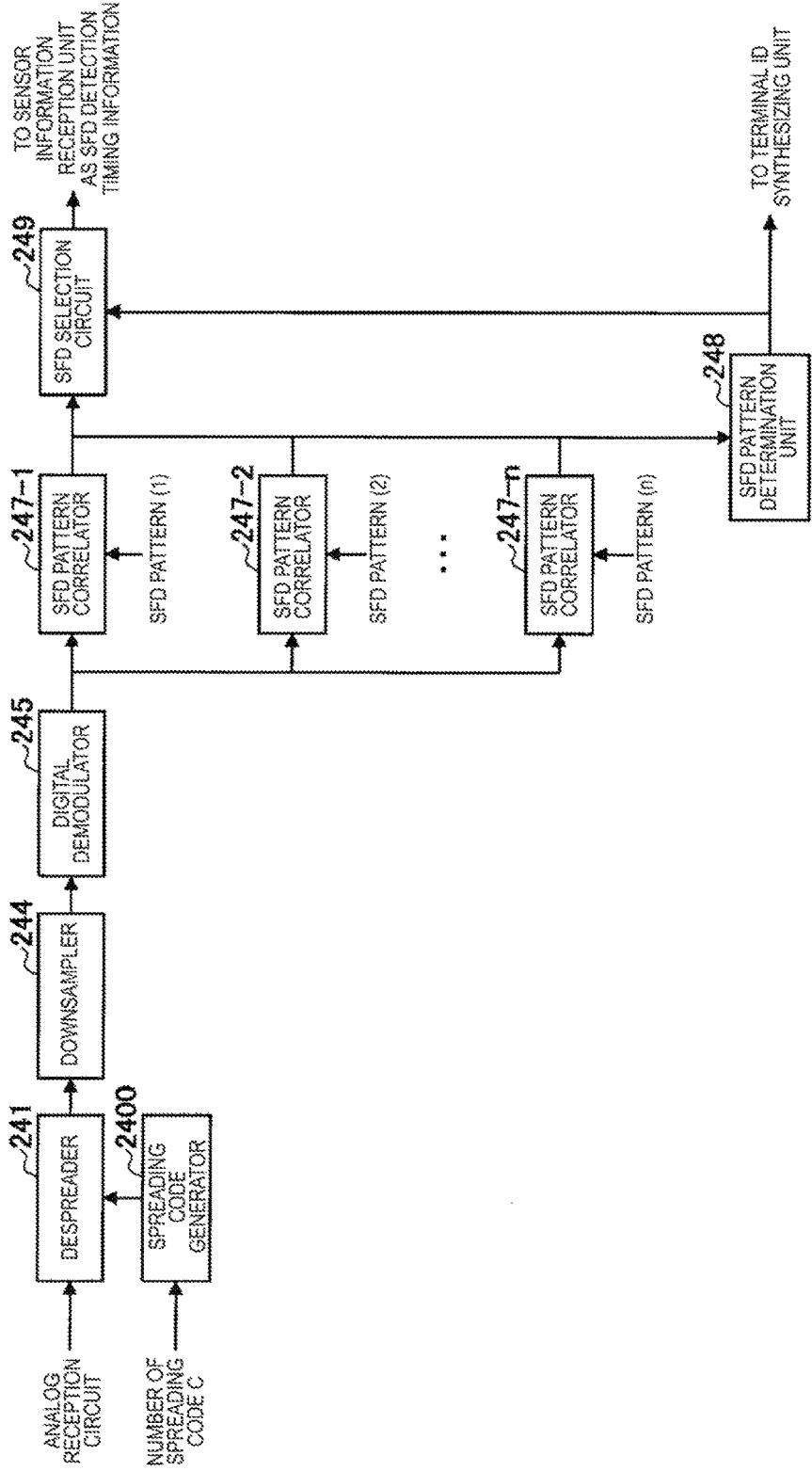

TRANSMISSION APPARATUS, RECEPTION APPARATUS, AND INFORMATION PROCESSING METHOD

CROSS REFERENCE TO RELATED APPLICATIONS

This application is a U.S. National Phase of International Patent Application No. PCT/JP2015/052314 filed on Jan. 28, 2015, which claims priority benefit of Japanese Patent Application No. JP 2014-035207 filed in the Japan Patent Office on Feb. 26, 2014. Each of the above-referenced applications is hereby incorporated herein by reference in its entirety.

TECHNICAL FIELD

The present disclosure relates to transmission apparatuses, reception apparatuses, and information processing methods.

BACKGROUND ART

Wireless sensor networks have been expected to be widespread. The wireless sensor networks collect behavior information of people, surrounding environment information, and the like by connecting wireless sensor terminals via wireless networks. In the wireless sensor terminals, wireless devices and sensor devices such as position sensors and temperature sensors are combined. Since many wireless sensor terminals are assumed to be installed in various locations, the wireless sensor terminals are required to be downsized, have low power consumption to work on batteries for a long time period, and be able to carry out long-distance transmission via wireless communication. Therefore, it is desired to develop a technology that satisfies such requirements.

For example, Patent Literature 1 listed below discloses a technology in which a mobile station performs, by using a spreading code, spectrum spreading on transmission information to which a pilot pattern allocated to each mobile station is added and transmits the spread transmission information, and a radio base station detects a path according to the pilot pattern and performs rake synthesis.

CITATION LIST

Patent Literature

Patent Literature 1: JP H11-252044A

SUMMARY OF INVENTION

Technical Problem

However, although the technology according to Patent Literature 1 simplifies the configuration of the radio base station (reception side), a radio device (transmission side) does not satisfy the above described requirements. Therefore, the present disclosure proposes a transmission apparatus, a reception apparatus, and an information processing method, which are novel and improved, and which enable a wireless device to carry out wireless transmission with less power consumption.

Solution to Problem

According to the present disclosure, there is provided a transmission apparatus including: a communication unit configured to transmit a transmission signal from the transmission apparatus to a reception apparatus via wireless communication; and a signal processing unit configured to generate the transmission signal in which transmission information is spread by using a spreading code selected according to identification information of the transmission apparatus, in order to enable the reception apparatus to acquire the identification information on the basis of an estimation result of the spreading code used for the transmission signal.

According to the present disclosure, there is provided a reception apparatus including: a communication unit configured to receive a signal transmitted from a transmission apparatus via wireless communication; and a signal processing unit configured to acquire identification information of the transmission apparatus on the basis of an estimation result of a spreading code used for a reception signal received by the communication unit.

According to the present disclosure, there is provided an information processing method including: transmitting a transmission signal from a transmission apparatus to a reception apparatus via wireless communication; and generating, by an electronic circuit, the transmission signal in which transmission information is spread by using a spreading code selected according to identification information of the transmission apparatus, in order to enable the reception apparatus to acquire the identification information on the basis of an estimation result of the spreading code used for the transmission signal.

According to the present disclosure, there is provided an information processing method including: receiving a signal transmitted from a transmission apparatus via wireless communication; and acquiring, by an electronic circuit, identification information of the transmission apparatus on the basis of an estimation result of a spreading code used for a received reception signal.

Advantageous Effects of Invention

As described above, according to the present disclosure, the wireless device is capable of wireless transmission with less power consumption. In addition, the effects described in the present specification are merely illustrative and demonstrative, and not limitative. In other words, the technology according to the present disclosure can exhibit other effects that are evident to those skilled in the art along with or instead of the effects based on the present specification.

BRIEF DESCRIPTION OF DRAWINGS

FIG. 13 is an explanatory diagram illustrating an internal configuration of a signal processing unit in a transmission apparatus according to a second embodiment.

FIG. 14 is an explanatory diagram illustrating an internal configuration of an SFD reception unit in a reception apparatus according to a second embodiment.

DESCRIPTION OF EMBODIMENT(S)

Figure 1:
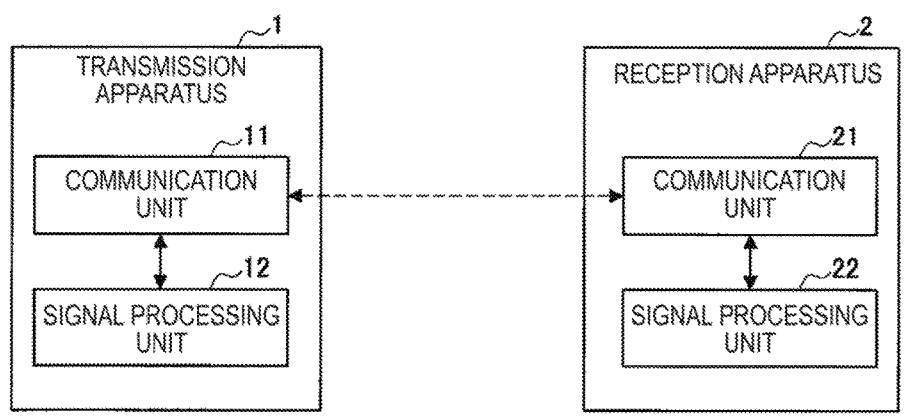
FIG. 1 is a block diagram illustrating a basic configuration of a wireless communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview
2. Transmission Apparatus according to Comparative Example
2-1. Internal Configuration of Signal Processing Unit
2-2. Effect of Deleting Terminal ID
3. First Embodiment
3-1. Transmission Apparatus
3-1-1. Internal Configuration of Signal Processing Unit
3-1-2. Operation Process
3-2. Reception Apparatus
3-2-1. Internal Configuration of Signal Processing Unit
3-2-2. Operation Process
4. Second Embodiment
4-1. Transmission Apparatus
4-2. Reception Apparatus
5. Conclusion

1. Overview

Figure 2:
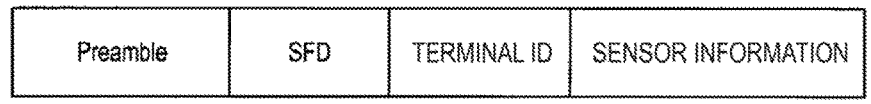
FIG. 2 is a diagram illustrating a configuration example of a wireless frame according to a comparative example.
Figure 3:
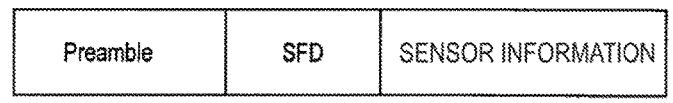
FIG. 3 is a diagram illustrating a configuration example of a wireless frame according to the present example.

First, with reference to FIGS. 1 to 3, an overview of a wireless communication system according to an embodiment of the present disclosure is described.

FIG. 1 is a block diagram illustrating a basic configuration of a wireless communication system according to an embodiment of the present disclosure. As illustrated in FIG. 1, the wireless communication system according to the present embodiment includes a transmission apparatus 1 and a reception apparatus 2. The transmission apparatus 1 includes a communication unit 11 and a signal processing unit 12. The reception apparatus 2 includes a communication unit 21 and a signal processing unit 22. Although FIG. 1 illustrates an example in which the transmission apparatus 1 and the reception apparatus 2 have a one-to-one relation, the transmission apparatus 1 and the reception apparatus 2 may have a one-to-many relation or a many-to-many relation.

The communication unit 11 has a function of transmitting a transmission signal from the transmission apparatus 1 to the reception apparatus 2 via wireless communication. The communication unit 11 communicates directly with the reception apparatus 2 or communicates wirelessly with the reception apparatus 2 via a network access point, by means of a wireless local area network (LAN), Wireless Fidelity (Wi-Fi) (registered trademark), infrared communication, Bluetooth (registered trademark), or the like. The communication unit 11 may include an analog transmission circuit, for example.

The signal processing unit 12 has a function of generating a transmission signal by performing various kinds of signal processing on transmission information (wireless frame) to be transmitted to external equipment. For example, the signal processing unit 12 is implemented by a central processing unit (CPU), and an electronic circuit such as a microprocessor or the like. The signal processing unit 12 may include read only memory (ROM) for storing programs and arithmetic parameters to be used, and random access memory (RAM) for temporarily storing parameters and the like that arbitrarily change. For example, the transmission apparatus 1 is connected to a sensor device, and performs signal processing on sensor information by the signal processing unit 12 to transmit the information to the reception apparatus 2 via the communication unit 11. The sensor information indicates a sensing result.

The communication unit 21 has a function of receiving the transmission signal transmitted from the transmission apparatus 1 via the wireless communication. The communication unit 21 communicates directly with the transmission apparatus 1 or communicates wirelessly with the transmission apparatus 1 via the network access point, by means of the wireless LAN, Wi-Fi, infrared communication, Bluetooth (registered trademark), or the like. The communication unit 21 may include an analog reception circuit, for example.

The signal processing unit 22 has a function of performing various kinds of signal processing on the reception signal received by the communication unit 21 and acquiring information stored in the reception signal. For example, the signal processing unit 22 is implemented by a CPU and an electronic circuit such as a microprocessor or the like. The signal processing unit 22 may include ROM for storing programs and arithmetic parameters to be used, and RAM for temporarily storing parameters and the like that arbitrarily change. For example, the reception apparatus 2 receives the signal transmitted from the transmission apparatus 1 via the communication unit 21, and extracts sensor information stored in the signal by using the signal processing unit 22.

The basic configuration of the wireless communication system according to the present embodiment has been described. Next, with reference to FIG. 2, a configuration of a general wireless frame is described as a comparative example.

FIG. 2 is a diagram illustrating a configuration example of the wireless frame according to the comparative example. As illustrated in FIG. 2, the wireless frame according to the comparative example is divided into a plurality of fields according to their role. For example, a preamble field is a field for storing a fixed pattern to be used for wireless frame detection, frequency synchronization, and the like. In the case where the preamble is a known pattern, the reception apparatus 2 is capable of detecting frequency drift and carrying out the frequency synchronization. A Sync Frame Detect (SFD) field is a field for storing a fixed pattern indicating a boundary of the wireless frame. The reception apparatus 2 is capable of identifying the boundary between the fields by detecting an SFD pattern. A terminal identifier (ID) field is a field for storing a terminal ID that is identification information for identifying the transmission apparatus 1. A sensor information field is a field for storing sensor information indicating a sensing result obtained from a sensor device.

Less power for transmission is necessary for a shorter time period for transmitting the transmission signal, and it is possible to carry out wireless transmission with less power consumption. Therefore, as illustrated in FIG. 3, the transmission apparatus 1 according to the present embodiment uses a wireless frame from which the terminal ID is omitted.

FIG. 3 is a diagram illustrating a configuration example of the wireless frame according to the present embodiment. As illustrated in FIG. 3, the wireless frame according to the present embodiment is the wireless frame according to the comparative example in FIG. 2 from which the terminal ID is omitted. When compared to the comparative example, the transmission apparatus 1 has a shorter time period to transmit the transmission signal since the terminal ID is omitted. This enables wireless transmission with less power consumption. However, in order to make the transmission apparatus 1 function as a wireless sensor terminal, it is necessary to transmit not only sensor information acquired from the sensor but also the terminal ID for identifying itself. Therefore, the reception apparatus 2 is capable of recognizing movement of the wireless sensor terminal, a sensed position, a setting of the sensor, and the like on the basis of the terminal ID to analyze the sensor information.

Therefore, the transmission apparatus 1 according to the present embodiment transmits a transmission signal spread using a spreading code selected according to the terminal ID. Subsequently, the reception apparatus 2 estimates the spreading code used for the received reception signal and acquires the terminal ID of the transmission apparatus 1 on the basis of the estimation result. Since the terminal ID is omitted, the transmission apparatus 1 is capable of carrying out the wireless transmission with less power consumption. In addition, since the reception apparatus 2 is capable of estimating the terminal ID, the transmission apparatus 1 can function as the wireless sensor terminal. In this specification, the spreading means direct spreading.

As described above, the overview of the wireless communication system according to the embodiment of the present disclosure has been described. Next, with reference to FIG. 4, a transmission apparatus according to the comparative example will be described.

2. Transmission Apparatus According to Comparative Example

[2-1. Internal Configuration of Signal Processing Unit]

Figure 4:
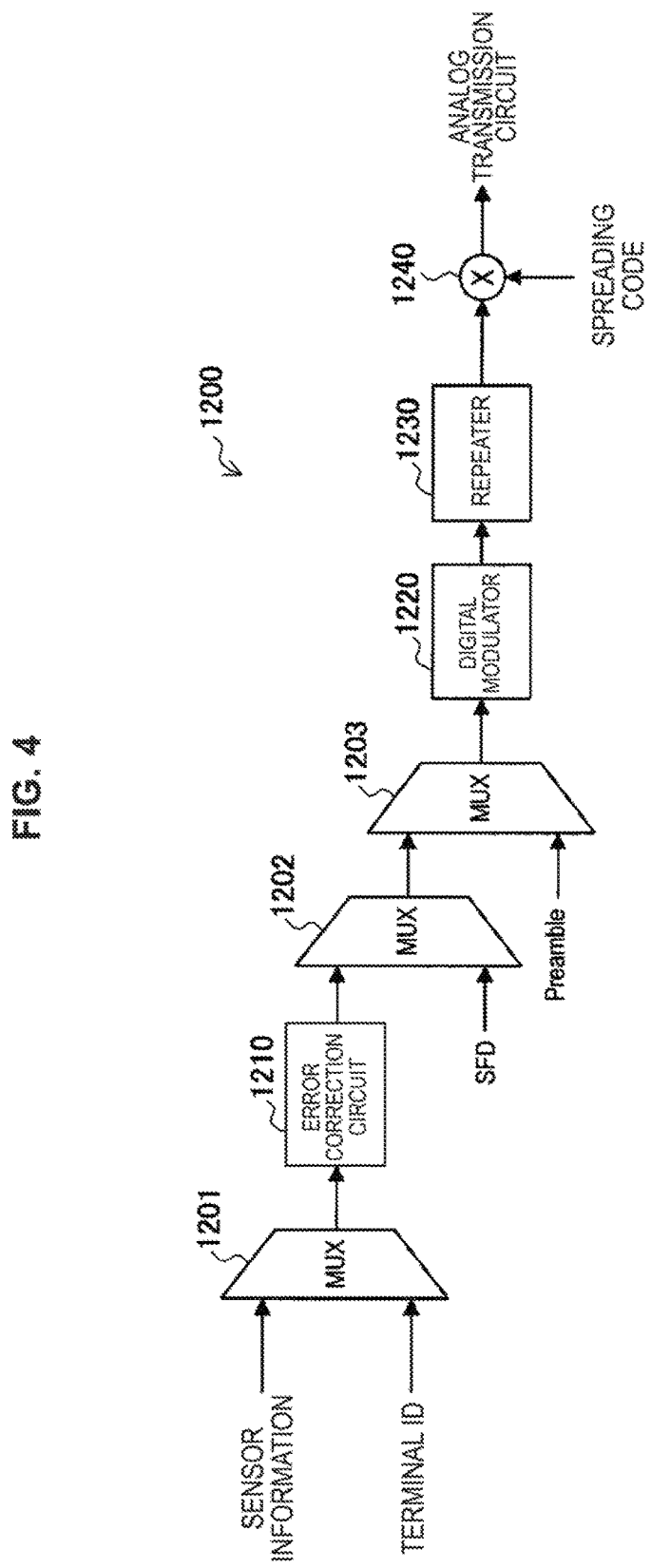
FIG. 4 is an explanatory diagram illustrating an internal configuration of a signal processing unit according to a comparative example.

FIG. 4 is an explanatory diagram illustrating an internal configuration of a signal processing unit according to the comparative example. As illustrated in FIG. 4, a signal processing unit 1200 according to the comparative example receives input of sensor information, a terminal ID, SFD, and a preamble, carries out various kinds of signal processing, and outputs a transmission signal spread by a spreading code to an analogue transmission circuit of a communication unit 11.

Each of multiplexers (MUXs) 1201, 1202, and 1203 illustrated in FIG. 4 is a circuit that orders input information pieces in time and output the ordered input information pieces. For example, the MUX 1201 receives input of sensor information and a terminal ID, outputs the terminal ID first, and then outputs the sensor information. In addition, the MUX 1202 first outputs information output from an error correction circuit 1210, and then outputs SFD. In addition, the MUX 1203 first outputs information output from the MUX 1202, and then output a preamble.

As illustrated in FIG. 4, the sensor information and terminal ID output from the MUX 1201 are input to the error correction circuit 1210. The error correction circuit 1210 is a circuit for encoding data by using an error-correcting code such as a convolutional code or a low-density parity-check (LDPC) code. The error correction circuit 210 improves an error resistance by adding a redundancy bit, for example. In this case, since data passes through the error correction circuit 1210, output data has longer bit length than bit length of input data. Such a rate is referred to as coding rate. In the case where the coding rate is ½, output is two times longer than input.

As illustrated in FIG. 4, the SFD is added via the MUX 1202 to the sensor information and terminal ID output from the error correction circuit 1210, and the preamble is further added via the MUX 1203. Thereby, the wireless frame illustrated in FIG. 2 is formed.

Subsequently, digital modulation is carried out by a digital modulator 1220. The digital modulator 1220 has a function of modulating a binary wireless frame output from the MUX 1203, to an electric signal. The digital modulator 1220 carries out the modulation using a modulation scheme such as Binary phase shift keying (BPSK) or Quadrature phase shift keying (QPSK).

For predetermined number of times, a repeater 1230 repeats the signal modulated by the digital modulator 1220.

Subsequently, a spreader 1240 spreads the signal. The spreader 1240 has a function of directly spreading a signal output from the repeater 1230. As a spreading code, the spreader 1240 may use a spreading code such as a Gold code or a pseudorandom sequence. Note that, the signal output from the spreader 1240 is output to the analog transmission circuit, and the communication unit 11 transmits an analog signal to the reception apparatus 2.

The internal configuration of the signal processing unit according to the comparative example has been described above.

[2-2. Effect of Deleting Terminal ID]

The transmission apparatus 1 according to an embodiment of the present disclosure carries out transmission by using the wireless frame from which the terminal ID is deleted. An example of this wireless frame is illustrated in FIG. 3. Hereinafter, effects of the wireless frame from which the terminal ID is deleted will be described in comparison with the above described comparative example.

As described with reference to FIG. 4, the sensor information and terminal ID pass through the error correction circuit 1210. Therefore, an amount of wirelessly transmitted information becomes larger than an amount of original information. As an example, the table 1 listed below shows a comparison between the amount of original information and the amount of wirelessly transmitted information, in the case where sensor information is 32 bits, a terminal ID is 16 bits, a coding rate is ½, SFD is 8 bits, and a preamble is 16 bits.

TABLE 1

| Transmission information amount | Wireless transfer information amount | Rate |
|---|---|---|
| Sensor information, 32 bit | 64 bit | 53% |
| Terminal ID, 16 bit | 32 bit | 27% |
| SFD, 8 bit | 8 bit | 7% |
| Preamble, 16 bit | 16 bit | 13% |

In the table 1, the transmission information amount means the amount of original information, and the wireless transfer information amount means the amount of wirelessly transmitted information after the information passes through the error correction circuit 1210. In addition, the table 1 includes a rate of each field to the wireless transfer information amount. As shown in the table 1, transfer of the terminal ID accounts for 27% of the wireless transfer information amount. Here, the sensor information varies according to results of measurement carried out by sensors, and preamble and SFD are information necessary for the reception apparatus 2 to synchronize. On the other hand, the terminal ID is unique to the transmission apparatus 1, and does not change with each transmission. Accordingly, deletion of the terminal ID from the wireless frame enables shortening of transmission time and low power consumption.

The effects of the transmission apparatus 1 according to the embodiment of the present disclosure in the case where the terminal ID has been deleted from the wireless frame has been described. Next, with reference to FIGS. 5 to 14, details of embodiments of the present disclosure will be described.

3. First Embodiment

[3-1. Transmission Apparatus]

The configuration of the transmission apparatus 1 according to this embodiment is illustrated in FIG. 1 as described above. Hereinafter, with reference to FIG. 5, the internal configuration of the signal processing unit 12 in the transmission apparatus 1 according to this embodiment will be described.

(3-1-1. Internal Configuration of Signal Processing Unit 12)

Figure 5:
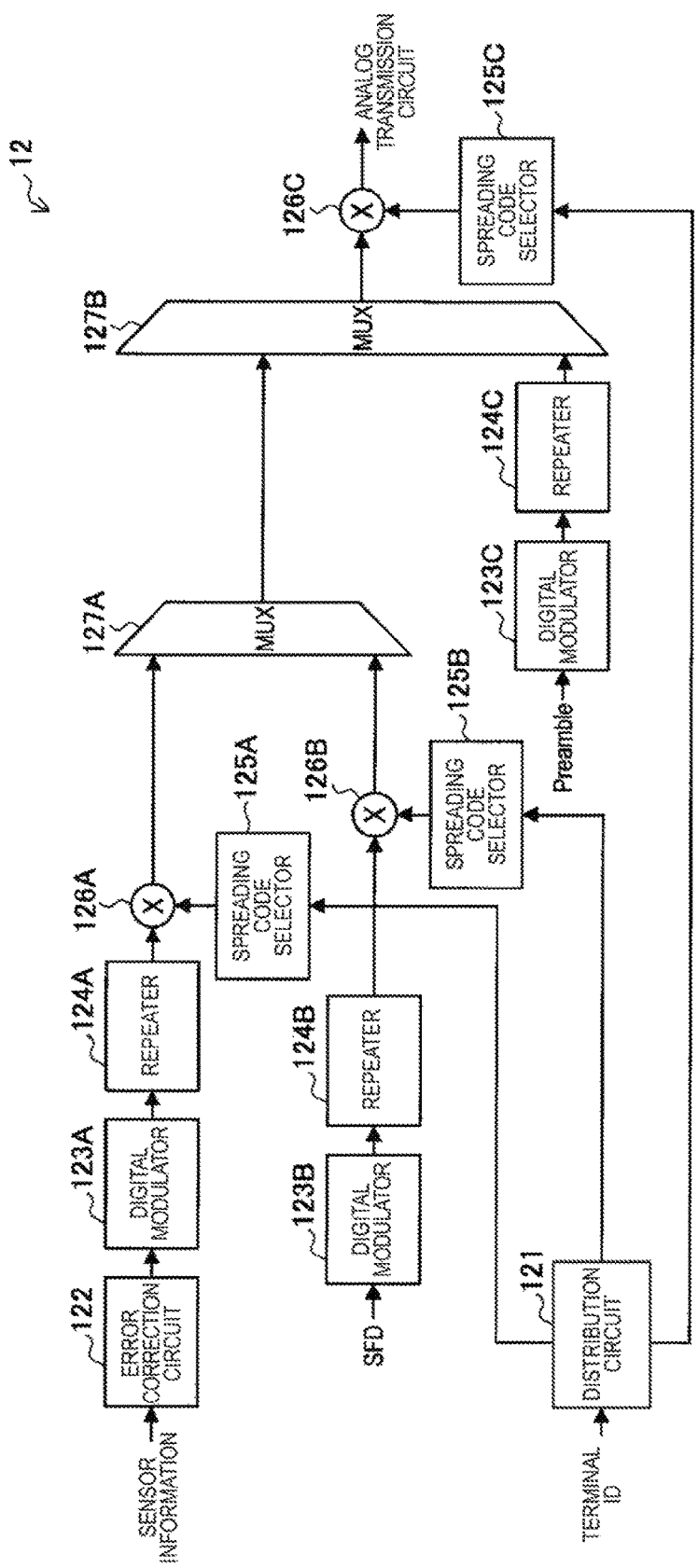
FIG. 5 is an explanatory diagram illustrating an internal configuration of a signal processing unit in a transmission apparatus according to a first embodiment.

FIG. 5 is an explanatory diagram illustrating the internal configuration of the signal processing unit 12 in the transmission apparatus 1 according to this embodiment. As illustrated in FIG. 5, the signal processing unit 12 according to this embodiment receives input of sensor information, a terminal ID, SFD, and a preamble, carries out various kinds of signal processing, and outputs a transmission signal to an analogue transmission circuit.

The signal processing unit 12 carries out various kinds of signal processing after dividing information to be transmitted. For example, as illustrated in FIG. 5, the signal processing unit 12 carries out various kinds of signal processing after dividing the information to be transmitted into information pieces to be stored in fields constituting the wireless frame illustrated in FIG. 3, such as the sensor information, SFD, and preamble. As illustrated in FIG. 5, a distribution circuit 121 of the signal processing unit 12 divides the terminal ID. The distribution circuit 121 has a function of dividing the terminal ID into a plurality of pieces of the terminal IDs.

The signal processing unit 12 spreads and combines the divided transmission information pieces by using each spreading code selected for each of the pieces of the terminal ID divided by the distribution circuit 121. Thereby the transmission signal is generated. As described later, by estimating the spreading codes used for the reception signal, the reception apparatus 2 estimates each of the pieces of the terminal ID divided in the transmission apparatus 1. Subsequently, by combining the pieces of the divided terminal ID, the reception apparatus 2 can acquire the terminal ID. In addition, after the division, selection of the spreading code according to a sequence shorter than the original terminal ID reduces a processing load generated when the reception apparatus 2 estimates the spreading code.

As described later in detail, in order to estimate the terminal ID of the transmission apparatus 1, the reception apparatus 2 carries out despreading processes for number of times equal to the number of candidates for spreading code that may be used by the transmission apparatus 1 for spreading. For example, the reception apparatus 2 carries out $2^{16}$ despreading processes in the case where a terminal ID is 16 bits and the transmission apparatus 1 selects a spreading code according to the 16-bit terminal ID without carrying out division. On the other hand, in the case where the transmission apparatus 1 divides the terminal ID and selects a spreading code according to a sequence shorter than the original terminal ID, the number of candidates for the spreading code becomes smaller than $2^{16}$. Therefore, the number of despreading processes carried out in the reception apparatus 2 is reduced.

The distribution circuit 121 divides the terminal ID in a manner that all pieces of the divided terminal ID have equal length. Specifically, the distribution circuit 121 divides the terminal ID in a manner that all pieces of the divided terminal ID have equal length or their difference becomes 1. For example, in the case of dividing a 16-bit terminal ID into 3 pieces, first output from the distribution circuit 121 is the first 6 bits, second output is the middle 5 bits, and third output is the last 5 bits among 16 bits. This minimizes the number of despreading processes in the reception apparatus 2, and the processing load of the reception apparatus 2 is reduced more.

The distribution circuit 121 spreads the transmission information by using the spreading code for each of fields while the number of the fields (elements) of the transmission information is the number of pieces of the divided terminal ID. For example, since the wireless frame illustrated in FIG. 3 has three fields, the distribution circuit 121 divides the terminal ID into three pieces of the terminal ID. In this way, the reception apparatus 2 can acquire information stored in each field by carrying out despreading in units of field.

Spreading code selectors 125A, 125B, and 125C use pieces of the terminal ID divided by the distribution circuit 121 for selecting a spreading code. Note that, in the present specification, the spreading code selectors 125A, 125B, and 125C are referred to as spreading code selectors 125 by omitting the alphabets attached to the end of the reference signs, in a case where it is not necessary to particularly distinguish the spreading code selectors 125A, 125B, and 125C. The same applies to other structural elements (digital modulators 123, repeaters 124, spreading code selectors 125, spreaders 126, MUXs 127, and the like).

As illustrated in FIG. 5, each of the spreading code selectors 125 selects a spreading code according to an input piece of the divided terminal ID. As the spreading code, the spreading code selector 125 uses at least one of a Gold code, a Walsh code, and a PN code, for example. These codes are only for illustrative purposes, and any other code may be used. For example, when using the Gold code, it is possible to generate different pseudorandom sequences by providing an initial value. Each of the spreading code selectors 125 uses the input piece of the divided terminal ID as the initial value to select a spreading code. When using the Walsh code, it is possible to acquire a plurality of orthogonal spreading codes according to code length.

For example, the spreading code selector 125A selects a spreading code according to a value of the third output (last 5 bits) from the distribution circuit 121. For example, the spreading code selector 125A selects the Walsh code according to the input 5-bit value. The spreader 126A directly spreads a sensor information field by using the Walsh code selected by the spreading code selector 125A. Sensor information is input to the spreader 126A via an error correction circuit 122, the digital modulator 123A, and the repeater 124A. The configurations of the error correction circuit 122, the digital modulator 123, and the repeater 124 are similar to the configurations of the error correction circuit 1210, the digital modulator 1220, and the repeater 1230 that have been described with reference to FIG. 4. Accordingly, detailed description here is omitted. Hereinafter, the spreading code selected by the spreading code selector 125A is also referred to as a spreading code A.

For example, the spreading code selector 125B selects a spreading code according to a value of the second output (middle 5 bits) from the distribution circuit 121. For example, the spreading code selector 125B selects the Walsh code according to the input 5-bit value. The spreader 126B directly spreads an SFD field by using the Walsh code selected by the spreading code selector 125B. The SFD is input to the spreader 126B via the digital modulator 123B and the repeater 124B. Hereinafter, the spreading code selected by the spreading code selector 125B is also referred to as a spreading code B.

For example, the spreading code selector 125C selects a spreading code according to a value of the first output (first 6 bits) from the distribution circuit 121. For example, the spreading code selector 125C generates the Gold code by using the input 6-bit value as the initial value. The spreader 126C directly spreads the entire wireless frame by using the Gold code generated by the spreading code selector 125C. The wireless frame is configured as follows. First, the sensor information field output from the spreader 126A and the SFD field output from the spreader 126B are input to the MUX 127A. The preamble is input to the MUX 127B via the digital modulator 123C and the repeater 124. Subsequently, the MUXs 127A and 127B combine the respective fields to form the wireless field. The configurations of the MUXs 127 are similar to the configurations of the MUXs 1201, 1202, and 1203 that have been described with reference to FIG. 4. Accordingly, detailed description here is omitted. Hereinafter, the spreading code selected by the spreading code selector 125C is also referred to as a spreading code C.

Here, by using another spreading code among a plurality of spreading codes, the signal processing unit 12 further spreads the transmission signal that has already been spread by using one spreading code among the plurality of spreading codes. In the example illustrated in FIG. 5, the signal that has already been spread by using the spreading code A or the spreading code B is further spread by using the spreading code C, as described above. The signal processing unit 12 places a field that the reception apparatus 2 should preferentially acquire like preamble, high in the hierarchy (carries out spreading for a fewer number of times). This enables the reception apparatus 2 to preferentially acquire this field.

The internal configuration of the signal processing unit 12 according to this embodiment has been described above. Next, with reference to FIG. 6, an operation process of the transmission apparatus 1 according to this embodiment will be described.

(3-1-2. Operation Process)

Figure 6:
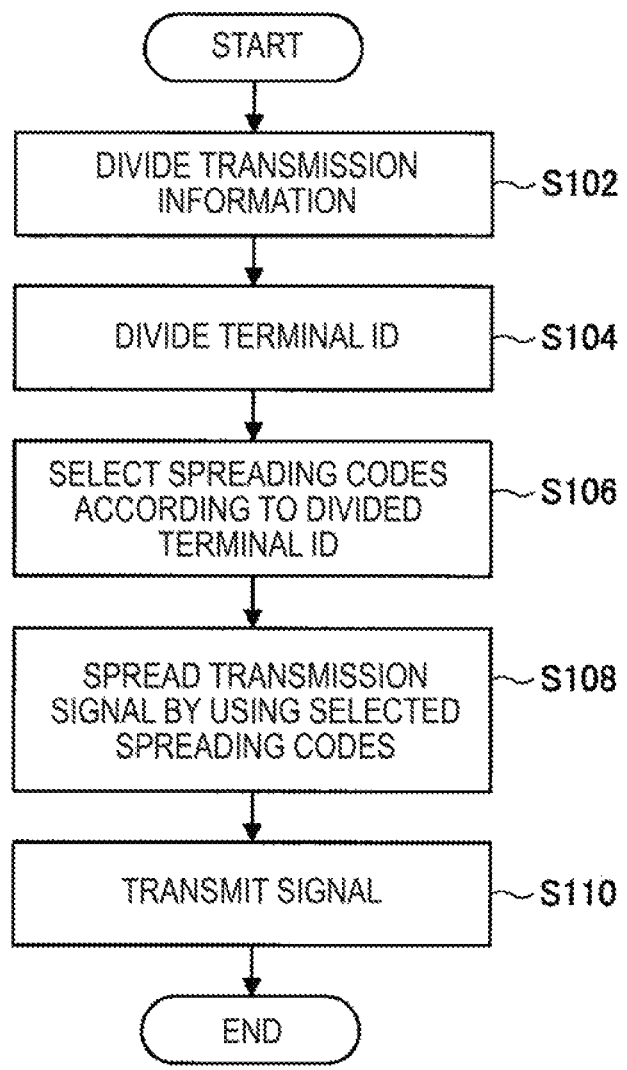
FIG. 6 is a flowchart illustrating an example of signal processing executed in a transmission apparatus according to a first embodiment.

FIG. 6 is a flowchart illustrating an example of signal processing executed in the transmission apparatus 1 according to this embodiment. As illustrated in FIG. 6, the signal processing unit 12 first divides transmission information in Step S102. For example, as described with reference to FIG. 5, the signal processing unit 12 divides the transmission information into information pieces to be stored in fields constituting the wireless frame.

Next, in Step S104, the signal processing unit 12 divides a terminal ID. For example, as described with reference to FIG. 5, the distribution circuit 121 divides a 16-bit terminal ID into the first 6 bits, the middle 5 bits, and the last 5 bits.

Subsequently, in Step S106, the signal processing unit 12 selects spreading codes according to the divided terminal ID. For example, as described with reference to FIG. 5, the spreading code selectors 125 select spreading codes according to values of the first 6 bits, the middle 5 bits, and the last 5 bits of the terminal ID divided by the distribution circuit 121.

Next, in Step S108, the signal processing unit 12 spreads a transmission signal by using the selected spreading codes. For example, as described with reference to FIG. 5, the spreader 126A spreads the sensor information by using the spreading code selected by the spreading code selector 125C. In addition, the spreader 126B spreads the SFD by using the spreading code selected by the spreading code selector 125B. In addition, the spreader 126C spreads the entire wireless frame by using the spreading code selected by the spreading code selector 125C.

Next, in Step S110, by using the analog transmission circuit, the communication unit 11 transmits the wireless frame generated by the signal processing unit 12 to the reception apparatus 2.

The example of the operation process of the transmission apparatus 1 according to this embodiment has been described.

[3-2. Reception Apparatus]

The configuration of the reception apparatus 2 according to this embodiment is illustrated in FIG. 1 as described above. Hereinafter, with reference to FIGS. 7 to 11, the internal configuration of the signal processing unit 22 in the reception apparatus 2 according to this embodiment will be described.

(3-2-1. Internal Configuration of Signal Processing Unit 22)

Figure 7:
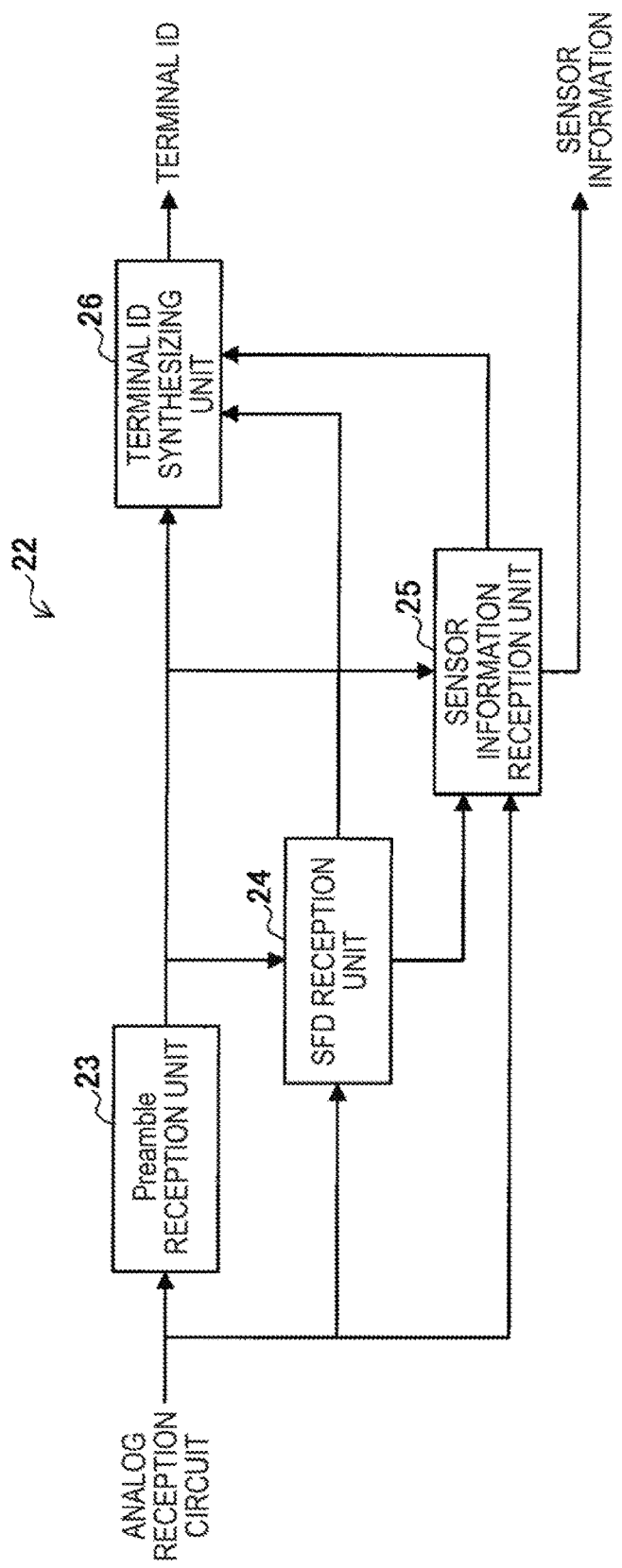
FIG. 7 is an explanatory diagram illustrating an internal configuration of a signal processing unit in a reception apparatus according to a first embodiment.

FIG. 7 is an explanatory diagram illustrating the internal configuration of the signal processing unit 22 in the reception apparatus 2 according to this embodiment. As illustrated in FIG. 7, the signal processing unit 22 according to this embodiment includes a preamble reception unit 23, an SFD reception unit 24, a sensor information reception unit 25, and a terminal ID synthesizing unit 26. The signal processing unit 22 acquires a terminal ID of the transmission apparatus 1 by receiving input of a reception signal received by the analog reception circuit of the communication unit 21, by estimating a plurality of spreading codes used for the reception signal, and by synthesizing sequences corresponding to the estimated spreading codes.

Specifically, the preamble reception unit 23 detects a preamble, and estimates the spreading code C used for spreading the preamble. The SFD reception unit 24 detects SFD, and estimates the spreading code B used for spreading the SFD. The sensor information reception unit 25 acquires sensor information, and estimates the spreading code A used for spreading the sensor information. Subsequently, the terminal ID synthesizing unit 26 acquires the terminal ID of the transmission apparatus 1 by synthesizing sequences corresponding to the respective spreading codes A to C estimated by the preamble reception unit 23, the SFD reception unit 24, and the sensor information reception unit 25. Hereinafter, with reference to FIGS. 8 to 11, details of the internal configurations of the structural elements of the signal processing unit 22 illustrated in FIG. 7 will be described.

Preamble Reception Unit 23

Figure 8:
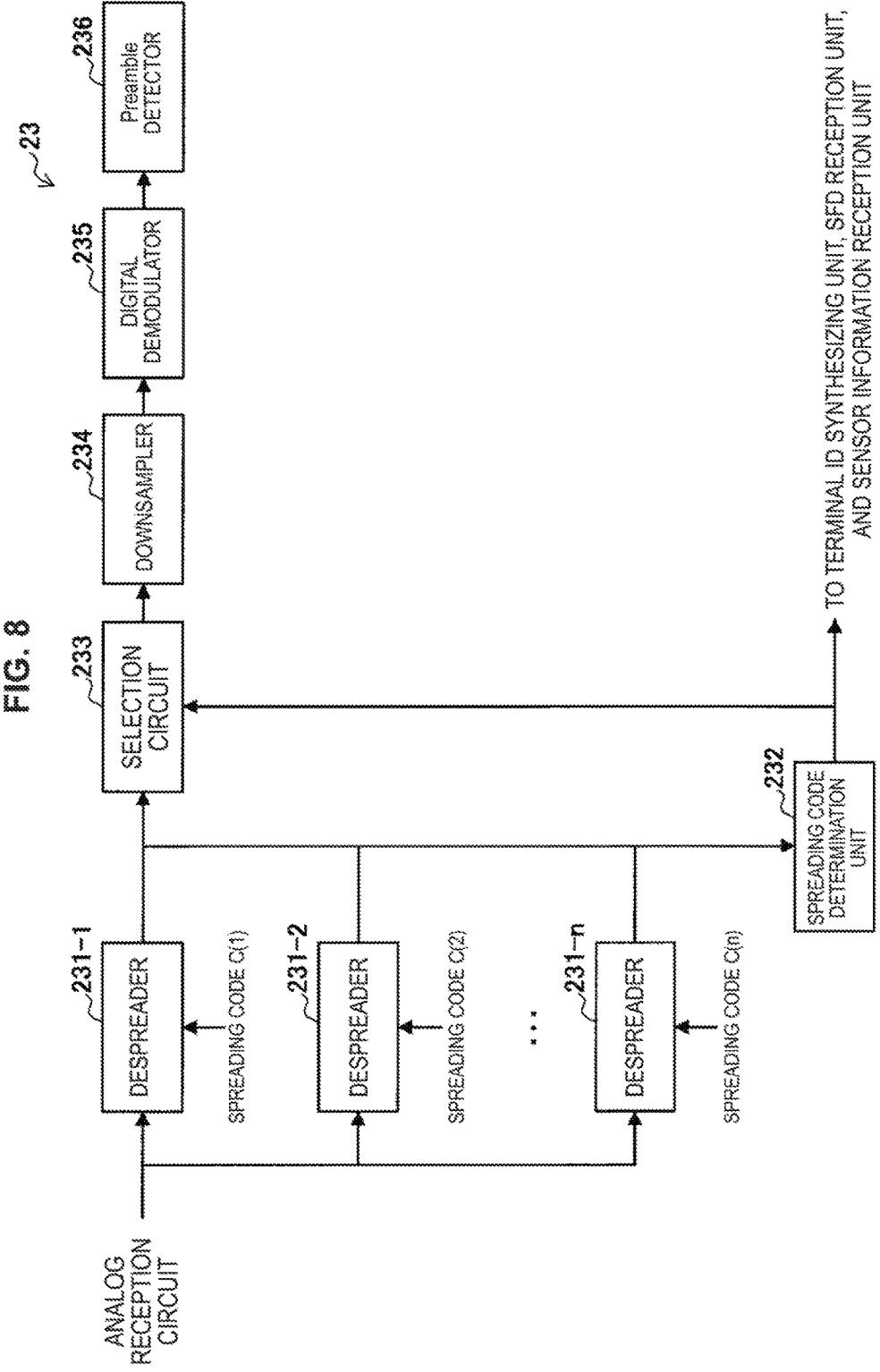
FIG. 8 is an explanatory diagram illustrating an internal configuration of a preamble reception unit in a reception apparatus according to a first embodiment.

FIG. 8 is an explanatory diagram illustrating the internal configuration of the preamble reception unit 23 in the reception apparatus 2 according to this embodiment. Despreaders 231-1 1 to 231-$n$ carry out despreading processes in parallel. The despreading processes use a spreading code C(1) to a spreading code c(n) that are n types of candidates that may be the spreading code C used by the transmission apparatus 1 to spread the preamble. For example, n is $2^6$=64 in the case where the transmission apparatus 1 selects the spreading code C on the basis of a 6-bit value. Hereinafter, the despreaders 231-1 to 231-$n$ are simply referred to as despreaders 213 in a case where it is not necessary to particularly distinguish the despreaders 231-1 to 231-$n$. The despreaders 231 output results of the despreading to a spreading code determination unit 232. Hereinafter, with reference to FIG. 9, the internal configuration of the despreader 231 will be described.

Figure 9:
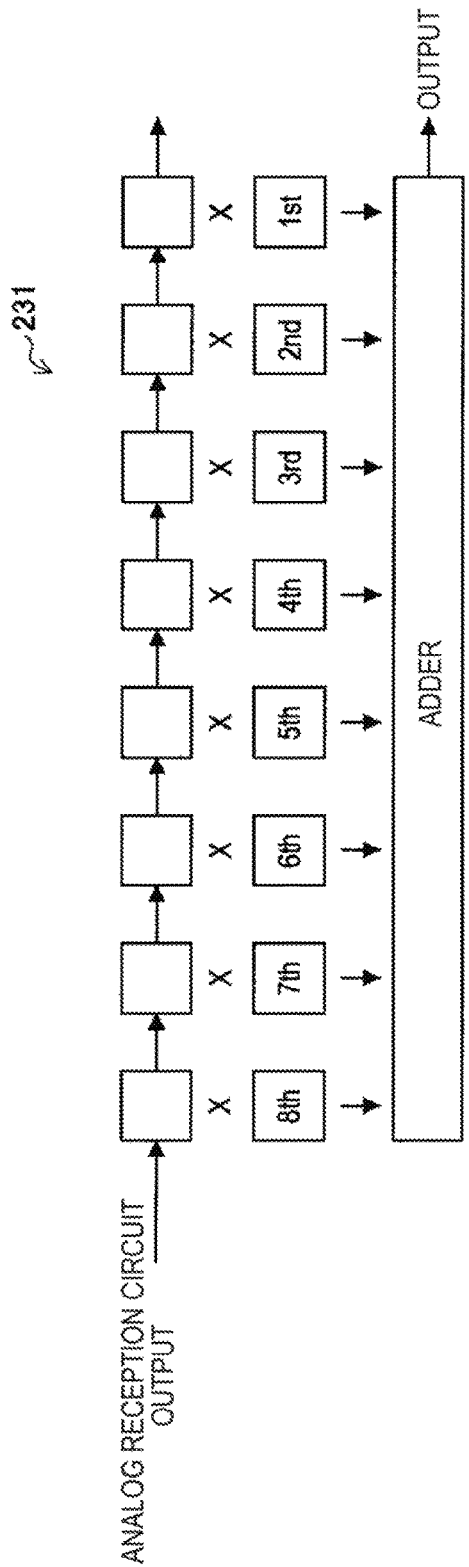
FIG. 9 is an explanatory diagram illustrating an internal configuration of a despreader according to a first embodiment.

FIG. 9 is an explanatory diagram illustrating the internal configuration of each of the despreaders 231 according to this embodiment. The despreader illustrated in FIG. 9 is a despreader generally referred to as a sliding correlator. The top of the despreader in FIG. 9 is a delay circuit which has a function of delaying an input signal by one sample. The middle of the despreader in FIG. 9 illustrates each bit of a spreading code in the case where the length of the spreading code is 8, as an example. For example, "8th" in FIG. 9 indicates the 8th bit of the spreading code, and "1st" indicates the first bit of the spreading code. The bottom of the despreader in FIG. 9 is an adder. The data received by the analog reception circuit is input to the despreader 231 as a reception digital signal, and passes through the delay circuit while being delayed by one sample. The despreader 231 multiplies output from each stage of the delay circuit by each bit of the spreading code, and outputs a value obtained by the adder that adds results of the multiplication, as a result of the despreading. The number of the results of the multiplication is equivalent to the length of the spreading code. The spreading code used by the despreader 231 is externally designated like the spreading code C(1) to the spreading code C(n) in FIG. 8. The internal configuration of the despreader 231 has been described. Next, the internal configuration of the preamble reception unit 23 will be described again.

On the basis of the result of the despreading, the spreading code determination unit 232 determines (estimates) a candidate as the spreading code used for spreading the preamble part, the candidate having a highest correlation with the reception signal among n types of candidates for the spreading code. Subsequently, the spreading code determination unit 232 outputs the number (1 to n) of the spreading code determined to have the highest correlation, to the selection circuit 233, the SFD reception unit 24, the sensor information reception unit 25, and the terminal ID synthesizing unit 26. The selection circuit 233 selects the result of despreading carried out by the despreader 231 that has used the spreading code having the number designated by the spreading code determination unit 232, and outputs the selected result to the downsampler 234. The downsampler 234 carries out downsampling according to the length of the spreading code. For example, in the case where the length of the spreading code is 8, the downsampler 234 selects one of every 8 samples. The digital demodulator 235 digitally demodulates a signal downsampled by the downsampler 234, and outputs the signal to the preamble detector 236.

The preamble detector 236 has a function of determining whether or not the sequence demodulated by the digital demodulator 235 is consistent with a fixed preamble pattern. The signal processing unit 22 detects presence or absence of the wireless frame on the basis of a result determined by the preamble detector 236, and acquires frequency synchronization. The Gold code has a characteristic by which a large difference may be generated between an autocorrelation value in the case where a phase difference is zero and an autocorrelation value in the case where there is a shift. Therefore the Gold code is suitable for detecting a preamble at a time when bits have not been synchronized yet. Therefore, in the case where the transmission apparatus 1 has used the Gold code for spreading the preamble, the signal processing unit 22 can accurately acquire frequency synchronization.

SFD Reception Unit 24

Figure 10:
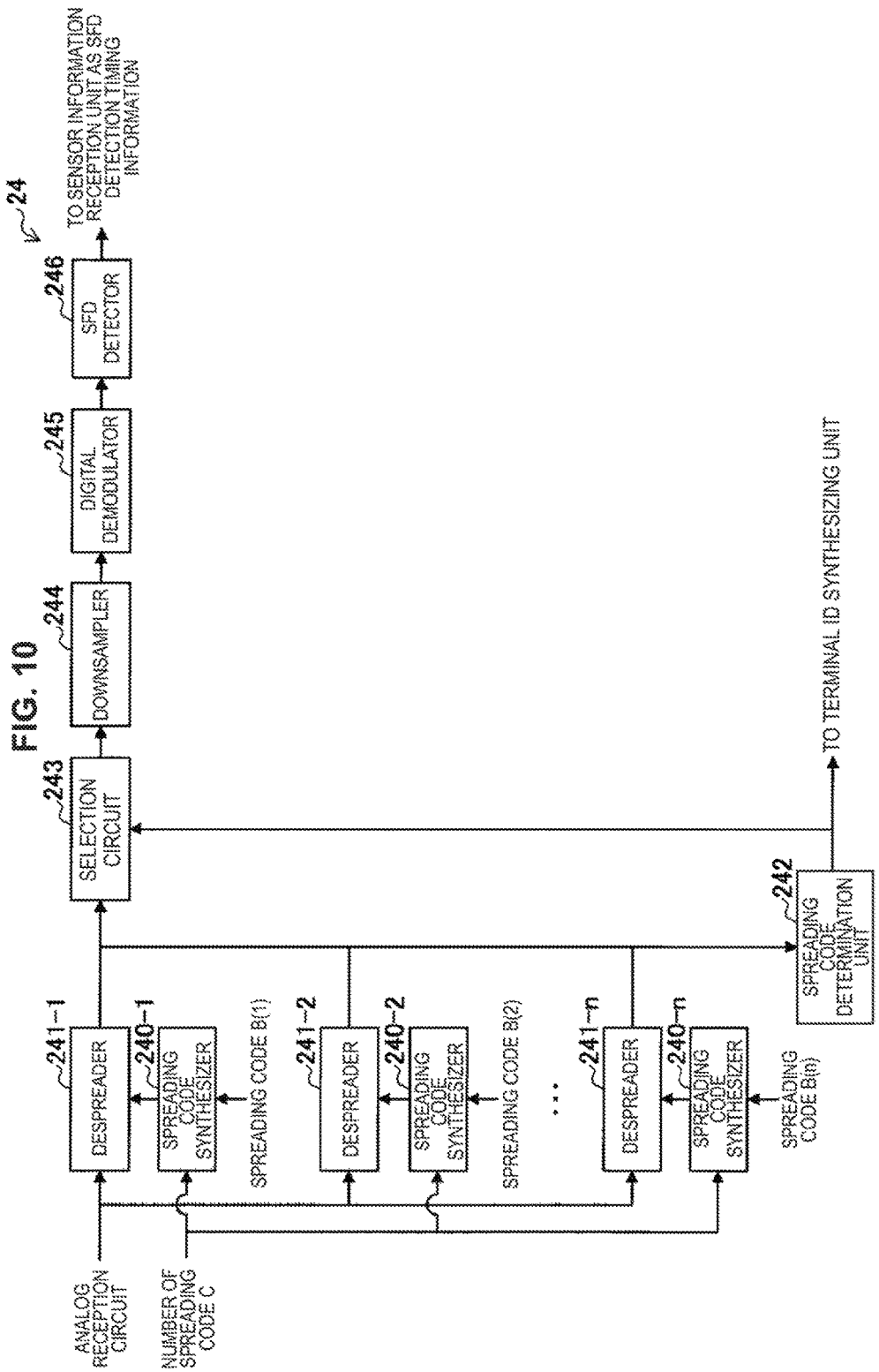
FIG. 10 is an explanatory diagram illustrating an internal configuration of an SFD reception unit in a reception apparatus according to a first embodiment.

FIG. 10 is an explanatory diagram illustrating the internal configuration of the SFD reception unit 24 in the reception apparatus 2 according to this embodiment. Despreaders 241-1 to 241-$n$ carry out despreading processes in parallel. The despreading processes use a spreading code B(1) to a spreading code B(n) that are n types of candidates that may be the spreading code B used by the transmission apparatus 1 to spread the SFD.

As described with reference to FIG. 5, the transmission apparatus 1 directly spreads the SFD field by using the spreading code C and the spreading code B. Therefore, the SFD reception unit 24 synthesizes the spreading code C and the spreading code B and carries out despreading on the basis of the number of the spreading code C output from the preamble reception unit 23. Specifically, each of spreading code synthesizers 240-1 to 240-$n$ synthesizes the spreading code C and each of a spreading code B(1) to a spreading code B(n) that are n types of sequences that may be the spreading code B used by the transmission apparatus 1 to spread the SFD. Note that, n is $2^5$=32 in the case where the transmission apparatus 1 selects the spreading code B on the basis of a 5-bit value. The spreading codes are synthesized after setting "C1st×B1st, C2nd×B2nd, C3rd×B3rd, and C4th×B4th" in the case where the length of codes is 4, respective bits of the spreading code C are "C1st, C2nd, C3rd, and C4th", and respective bits of the spreading code B are "B1st, B2nd, B3rd, and B4th". Hereinafter, the despreaders 241-1 to 241-$n$ are simply referred to as despreaders 241 in a case where it is not necessary to particularly distinguish the despreaders 241-1 to 241-$n$. The same applies to other structural elements (spreading code synthesizers 240 and the like).

The configurations of the despreaders 241 are similar to the configurations of the despreaders 231 that have been described with reference to FIG. 9. Accordingly, repeated detailed description here is omitted. Each of the despreaders 241 carries out despreading by using a spreading code output from each of the spreading code synthesizers 240, and outputs a result of the despreading.

On the basis of the result of the despreading, the spreading code determination unit 242 determines a candidate as the spreading code used for spreading the SFD part, the candidate having a highest correlation with the reception signal among n types of candidates for the spreading code. Subsequently, the spreading code determination unit 242 outputs the number (1 to n) of the spreading code determined to have the highest correlation, to the selection circuit 243 and the terminal ID synthesizing unit 26. The selection circuit 243 selects the result of despreading carried out by the despreader 241 that has used the spreading code having the number designated by the spreading code determination unit 242, and outputs the selected result to the downsampler 244. The downsampler 244 carries out downsampling according to the length of the spreading code. The digital demodulator 245 digitally demodulates a signal downsampled by the downsampler 244, and outputs the signal to the SFD detector 246.

The SFD detector 246 has a function of determining whether or not the sequence demodulated by the digital demodulator 245 is consistent with a fixed SFD pattern. The signal processing unit 22 determines a timing of receiving sensor information on the basis of a result determined by the SFD detector 246, and sets a trigger to activate the sensor information reception unit 25. The Walsh code is suitable for estimating the spreading code after bits are synchronized by detecting the preamble, since cross correlation (interference) between the codes are zero in the case where the bits have been synchronized. Therefore, in the case where the transmission apparatus 1 has used the Walsh code for spreading the SFD, the signal processing unit 22 can accurately detect the SFD and can set the trigger to activate the sensor information reception unit 25 at an appropriate timing.

Sensor Information Reception Unit 25

Figure 11:
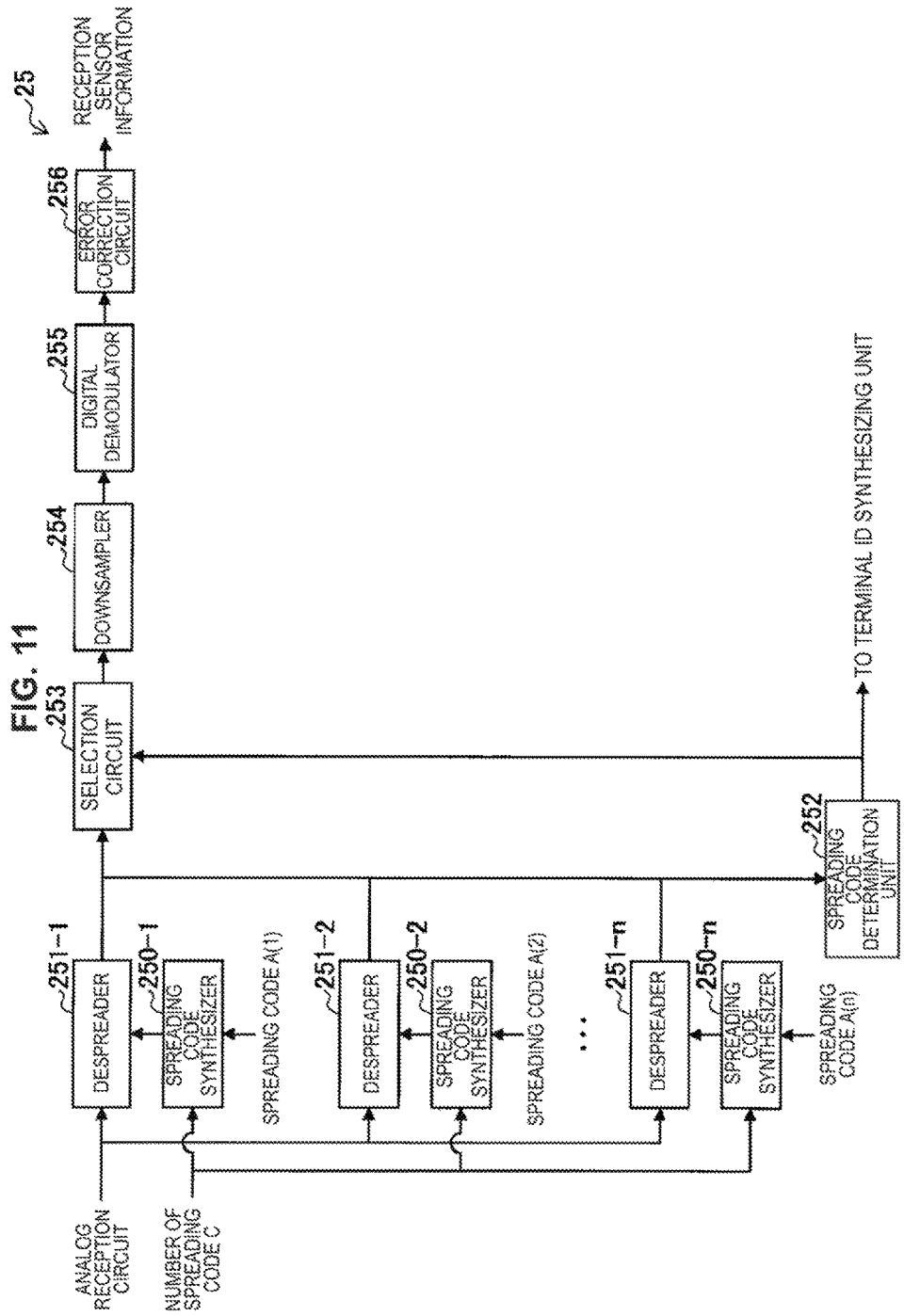
FIG. 11 is an explanatory diagram illustrating an internal configuration of a sensor information reception unit in a reception apparatus according to a first embodiment.

FIG. 11 is an explanatory diagram illustrating the internal configuration of the sensor information reception unit 25 in the reception apparatus 2 according to this embodiment. Despreaders 251-1 to 251-$n$ carry out despreading processes in parallel. The despreading processes use a spreading code A(1) to a spreading code A(n) that are n types of candidates that may be the spreading code A used by the transmission apparatus 1 to spread the sensor information.

As described with reference to FIG. 5, the transmission apparatus 1 directly spreads the sensor information field by using the spreading code C and the spreading code A. Therefore, the sensor information reception unit 25 synthesizes the spreading code C and the spreading code A and carries out despreading on the basis of the number of the spreading code C output from the preamble reception unit 23. Specifically, each of spreading code synthesizers 250-1 to 250-$n$ synthesizes the spreading code C and each of a spreading code A(1) to a spreading code A(n) that are n types of sequences that may be the spreading code A used by the transmission apparatus 1 to spread the sensor information. Note that, n is $2^5=32$ in the case where the transmission apparatus 1 selects the spreading code A on the basis of a 5-bit value. The spreading codes are synthesized after setting "C1st×A1st, C2nd×A2nd, C3rd×A3rd, and C4th×A4th" in the case where the length of codes is 4, respective bits of the spreading code C are "C1st, C2nd, C3rd, and C4th", and respective bits of the spreading code A are "A1st, A2nd, A3rd, and A4th", for example. Hereinafter, the despreaders 251-1 to 251-$n$ are simply referred to as despreaders 251 in a case where it is not necessary to particularly distinguish the despreaders 251-1 to 251-$n$. The same applies to other structural elements (spreading code synthesizers 250 and the like).

The configurations of the despreaders 251 are similar to the configurations of the despreaders 231 that have been described with reference to FIG. 9. Accordingly, repeated detailed description here is omitted. Each of the despreaders 251 carries out despreading by using a spreading code output from each of the spreading code synthesizers 250, and outputs a result of the despreading.

On the basis of the result of the despreading, the spreading code determination unit 252 determines a candidate as the spreading code used for spreading the sensor information part, the candidate having a highest correlation with the reception signal among n types of candidates for the spreading code. Subsequently, the spreading code determination unit 252 outputs the number (1 to n) of the spreading code determined to have the highest correlation, to the selection circuit 253 and the terminal ID synthesizing unit 26. The selection circuit 253 selects the result of despreading carried out by the despreader 251 that has used the spreading code having the number designated by the spreading code determination unit 252, and outputs the selected result to the downsampler 254. The downsampler 254 carries out downsampling according to the length of the spreading code. The digital demodulator 255 digitally demodulates a signal downsampled by the downsampler 254, and outputs the signal to the error correction circuit 256. The error correction circuit 256 decodes data by using a correction code, and outputs the sensor information.

Terminal ID Synthesizing Unit 26

The terminal ID synthesizing unit 26 has a function of reconfiguring the terminal ID by synthesizing sequences corresponding to spreading codes output from the preamble reception unit 23, the SFD reception unit 24, and the sensor information reception unit 25, on the basis of the numbers of the spreading codes. It is assumed that the terminal ID synthesizing unit 26 previously stores a correspondence relation between an input sequence (divided terminal ID) and an output sequence (spreading code) in each of the spreading code selection units 125A to 125C illustrated in FIG. 5. The terminal ID synthesizing unit 26 reconfigures the terminal ID by restoring each piece of the divided terminal ID and combining them on the basis of the correspondence relations.

The internal configuration of the signal processing unit 22 according to this embodiment has been described above. Next, with reference to FIG. 12, an operation process of the reception apparatus 2 according to this embodiment will be described.

(3-2-2. Operation Process)

Figure 12:
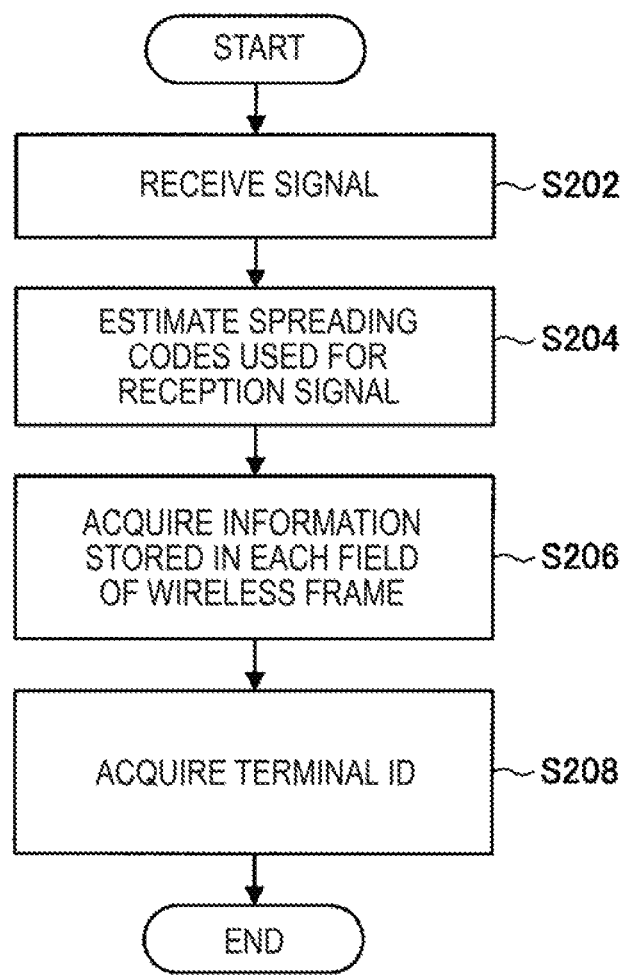
FIG. 12 is a flowchart illustrating an example of signal processing executed in a reception apparatus according to a first embodiment.

FIG. 12 is a flowchart illustrating an example of signal processing executed in the reception apparatus 2 according to this embodiment. As illustrated in FIG. 12, the communication unit 11 first receives a signal in Step S202.

Next, in Step S204, the signal processing unit 12 estimates spreading codes used for the reception signal. For example, as described with reference to FIGS. 7 to 11, the signal processing unit 12 estimates the spreading code used for spreading each frame of the wireless frame, in accordance with correlations with candidates for the spreading code.

Next, in Step S206, the signal processing unit 12 acquires information stored in each field of the wireless frame by using the spreading codes estimated in Step S204. For example, as described with reference to FIGS. 7 to 11, the preamble reception unit 23 detects the preamble, the SFD reception unit 24 detects the SFD, and the sensor information reception unit 25 acquires the sensor information.

Next, in Step S208, the terminal ID is acquired by synthesizing sequences corresponding to the spreading codes estimated in Step S204. For example, as described with reference to FIGS. 7 to 11, the terminal ID synthesizing unit 26 reconfigures the terminal ID by combining sequences corresponding to the respective spreading codes A to C estimated by the preamble reception unit 23, the SFD reception unit 24, and the sensor information reception unit 25.

The example of the operation process of the reception apparatus 2 according to this embodiment has been described.

4. Second Embodiment

In this embodiment, the transmission apparatus 1 selects a pattern of SFD according to a divided terminal ID instead of selecting a spreading code.

[4-1. Transmission Apparatus]

The configuration of the transmission apparatus 1 according to this embodiment is illustrated in FIG. 1 as described above. Hereinafter, with reference to FIG. 13, the internal configuration of the signal processing unit 12 in the transmission apparatus 1 according to this embodiment will be described.

FIG. 13 is an explanatory diagram illustrating the internal configuration of the signal processing unit 12 in the transmission apparatus 1 according to this embodiment. As illustrated in FIG. 3, the difference between the signal processing unit 12 according to this embodiment and the signal processing unit 12 according to the first embodiment described with reference to FIG. 5 is that the signal processing unit 12 according to this embodiment includes an SFD pattern selector 128.

The SFD pattern selector 128 selects an SFD pattern according to a terminal ID divided by the distribution circuit 121. In the first embodiment described with reference to FIG. 5, a fixed pattern common in all transmission apparatuses 1 is used for the SFD field. However, in this embodiment, the SFD pattern selector 128 selects a fixed pattern for each of the transmission apparatuses 1 as the SFD pattern, in accordance with the terminal ID of each of the transmission apparatuses 1. Specifically, as illustrated in FIG. 13, the SFD pattern selector 128 selects an SFD pattern according to a value of the second output (middle 5 bits) from the distribution circuit 121. The reception apparatus 2 can estimate the SFD pattern and acquire the terminal ID of the transmission apparatus 1 on the basis of the estimation result.

Sensor information passes through the error correction circuit 122, the digital modulator 123A, the repeater 124A, and, is spread by the spreader 126A using the spreading code A selected by the spreading code selector 125A, and is output to the MUX 127D.

The SFD pattern selected by the SFD pattern selector 128, and the preamble are input to the MUX 127C, pass through the digital modulator 123C and the repeater 124C, and input to MUX 127D. Subsequently, the MUX 127D combines the respective fields to form the wireless frame. Next, the spreader 126C spreads the entire wireless frame by using the spreading code C selected by the spreading code selector 125C, and outputs the wireless frame to the analog transmission circuit.

The internal configuration of the signal processing unit 12 in the transmission apparatus 1 according to this embodiment has been described above.

[4-2. Reception Apparatus]

The configuration of the reception apparatus 2 according to this embodiment is illustrated in FIG. 1 as described above. The signal processing unit 22 in the reception apparatus 2 according to this embodiment has a function of acquiring the terminal ID of a transmission apparatus 1 on the basis of a result of estimating an SFD pattern used for a reception signal. The internal configuration of the signal processing unit 22 is the same as illustrated in FIG. 7. However, the internal configuration of the SFD reception unit 24 is different from the internal configuration of the SFD reception unit 24 according to the first embodiment that has been described with reference to FIG. 10. Hereinafter, with reference to FIG. 14, the internal configuration of the SFD reception unit 24 in the reception apparatus 2 according to this embodiment will be described.

FIG. 14 is an explanatory diagram illustrating the internal configuration of the SFD reception unit 24 in the reception apparatus 2 according to this embodiment. A spreading code generator 2400 has a function of generating a spreading code corresponding to the number of a spreading code. Specifically, the spreading code generator 2400 generates the spreading code C corresponding to the number of the spreading code C output from the preamble reception unit 23, and outputs the spreading code C to the despreader 241. By using the spreading code generated by the spreading code generator 2400, the despreader 241 despreads a reception signal received from the analog reception circuit, and outputs a despread signal to the downsampler 244. The downsampler 244 carries out downsampling according to the length of the spreading code. The digital demodulator 245 digitally demodulates a signal downsampled by the downsampler 244, and outputs the signal to SFD pattern correlators 247-1 to 247-*n*. Hereinafter, the SFD pattern correlators 247-1 to 247-*n* are simply referred to as SFD pattern correlators 247 in a case where it is not necessary to particularly distinguish the SFD pattern correlators 247-1 to 247-*n*.

The configuration of each of the SFD pattern correlator 247 is similar to the configuration of the despreader 231 described with reference to FIG. 9. The despreader 231 having the SFD pattern instead of the spreading code in the middle in FIG. 9 operates as the SFD pattern correlator 247. Specifically, the SFD pattern correlators 247 calculate correlations between SFD patterns (1) to (n) and a sequence output from the digital demodulator 245 in parallel. The SFD patterns (1) to (n) are n types of candidates that may be used by the transmission apparatus 1 as an SFD pattern. Note that, n is $2^5=32$ in the case where the transmission apparatus 1 selects the SFD pattern on the basis of a 5-bit value. The SFD pattern correlators 247 calculate the correlations by using the SFD patterns (1) to (n), and output results of the calculation.

On the basis of the results of the calculation obtained by the SFD pattern correlators 247, the SFD pattern determination unit 248 determines (estimates) a candidate as the SFD pattern, the candidate having a highest correlation with the reception signal among n types of the candidates for the SFD pattern. Subsequently, the SFD pattern determination unit 248 outputs the number (1 to n) of the SFD pattern determined to have the highest correlation, to the SFD selection circuit 249 and the terminal ID synthesizing unit 26. The SFD selection circuit 249 determines a timing of receiving sensor information on the basis of the correlation result obtained by the SFD pattern correlator 247 using the SFD pattern having the designated number, and sets a trigger to activate the sensor information reception unit 25.

The terminal ID synthesizing unit 26 reconfigures the terminal ID by synthesizing a corresponding sequence on the basis of the numbers of the spreading codes output from the preamble reception unit 23, the sensor information reception unit 25, and on the basis of the number of the SFD pattern output from the SFD reception unit 24. It is assumed that the terminal ID synthesizing unit 26 according to this embodiment previously stores a correspondence relation between an input sequence (divided terminal ID) and an output sequence (SFD pattern) of the SFD pattern selector 128 illustrated in FIG. 13. The terminal ID synthesizing unit 26 reconfigures the terminal ID by restoring the divided terminal ID from the SFD pattern on the basis of the correspondence relation.

The internal configuration of the SFD reception unit 24 in the reception apparatus 2 according to this embodiment has been described above.

5. Conclusion

As described above, in the wireless communication system according the embodiments of the present disclosure, the transmission apparatus 1 is capable of wireless transmission with less power consumption. Specifically, by using a spreading code selected according to a terminal ID, the transmission apparatus 1 generates a transmission signal in which a wireless frame without the terminal ID is spread, and transmits the transmission signal to the reception apparatus 2. Accordingly, the transmission apparatus 1 can shorten the transmission time by omitting the terminal ID and can achieve low power consumption.

The reception apparatus 2 estimates the spreading code used for the received reception signal and acquires the terminal ID of the transmission apparatus 1 on the basis of a result of the estimation. This enables specifying a transmission source of sensor information even in the case where the terminal ID is omitted from the wireless frame. In addition, it is possible to cause the transmission apparatus 1 to function as the wireless sensor terminal.

Hereinabove, although the preferable embodiments of the present disclosure have been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, according to the embodiments described above, the example in which spreading is carried out using a spreading code according to a terminal ID while the terminal ID is omitted since the terminal ID is a fixed value that is not changed has been described. However, the present technology is not limited to this example. The transmission apparatus 1 may carry out spreading using a spreading code according to a value of a field other than the terminal ID. The value of the field does not change or there is only a small change in the value of the field. In the case of sensor information whose range is limited such as a thermometer, there may be only a small change in a part of bits of the sensor information. In such a case, the transmission apparatus 1 may omit such a part that have not been changed so much, and may carry out spreading using a spreading code according to this part. On the other hand, it is also possible for the transmission apparatus 1 to omit an arbitrary field whose value changes such as sensor information and carry out spreading using a spreading code according to the value of the omitted field. In both cases, the transmission apparatus 1 is capable of wireless transmission with less power consumption like the case of omitting a terminal ID.

In the first embodiment, spreading is carried out for each field of a wireless frame. However, the present technology is not limited to such an example. For example, the transmission apparatus 1 may spread a set of a plurality of fields by using one spreading code, or may carry out spreading by dividing the field.

In the second embodiment, an SFD pattern is selected according to a terminal ID. However, the present technology is not limited to such an example. Instead of the SFD pattern, the transmission apparatus 1 may select a fixed pattern according to the terminal ID. The fixed pattern is stored in an arbitrary field such as preamble.

In the embodiments, the example of the wireless frame used by the transmission apparatus 1 has been described with reference to FIG. 3. However, the present technology is not limited to this example. The transmission apparatus 1 may uses a known frame format or any other format as the wireless frame, such as IEEE802.11.

The processing by each apparatus described herein may be realized by any one of software, hardware, and a combination of software and hardware. Programs included in the software are stored in advance, for example, in recording media (non-transitory media) provided inside or outside of the respective apparatuses. Each program is read out, for example, by RAM when each program is executed, and executed by a processor such as a CPU.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A transmission apparatus including:

a communication unit configured to transmit a transmission signal from the transmission apparatus to a reception apparatus via wireless communication; and a signal processing unit configured to generate the transmission signal in which transmission information is spread by using a spreading code selected according to identification information of the transmission apparatus, in order to enable the reception apparatus to acquire the identification information on the basis of an estimation result of the spreading code used for the transmission signal.

(2)

The transmission apparatus according to (1), wherein the signal processing unit divides the identification information and the transmission information to spread and combine pieces of the divided transmission information by using the spreading code selected for each piece of the divided identification information.

(3)

The transmission apparatus according to (2), wherein, by using another spreading code among a plurality of spreading codes, the signal processing unit further spreads the transmission signal that has already been spread by using one spreading code among the plurality of spreading codes.

(4)

The transmission apparatus according to (2) or (3), wherein the signal processing unit performs spreading by using the spreading code for each element of the transmission information while the number of elements is the number of pieces of the divided identification information.

(5)

The transmission apparatus according to any one of (2) to (4), wherein the signal processing unit divides the identification information in a manner that all pieces of the divided identification information have equal length.

(6)

The transmission apparatus according to any one of (1) to (5), wherein the transmission information includes a fixed pattern for each transmission apparatus, and wherein the signal processing unit selects the pattern according to the identification information, in order to enable the reception apparatus to acquire the identification information on the basis of an estimation result of the pattern.

(7)

The transmission apparatus according to (6), wherein the pattern is stored in a Sync Frame Detect (SFD) field.

(8)

The transmission apparatus according to any one of (1) to (7), wherein, as the spreading code, the signal processing unit uses at least one of a Gold code, a Walsh code, and a PN code.

(9)

A reception apparatus including:

a communication unit configured to receive a signal transmitted from a transmission apparatus via wireless communication; and a signal processing unit configured to acquire identification information of the transmission apparatus on the basis of an estimation result of a spreading code used for a reception signal received by the communication unit.

(10)

The reception apparatus according to (9), wherein the signal processing unit acquires the identification information by estimating a plurality of the spreading codes used for the reception signal and by synthesizing sequences corresponding to the estimated spreading codes.

(11)

The reception apparatus according to (10), wherein the signal processing unit acquires the identification information on the basis of an estimation result of a fixed pattern for each transmission apparatus used for the reception signal.

(12)

The reception apparatus according to any one of (9) to (11), wherein the signal processing unit estimates a candidate as the spread code used for the reception signal, the candidate having a highest correlation with the reception signal among candidates for the spreading code.

(13)

An information processing method including:

transmitting a transmission signal from a transmission apparatus to a reception apparatus via wireless communication; and generating, by an electronic circuit, the transmission signal in which transmission information is spread by using a spreading code selected according to identification information of the transmission apparatus, in order to enable the reception apparatus to acquire the identification information on the basis of an estimation result of the spreading code used for the transmission signal.

(14)

An information processing method including:

receiving a signal transmitted from a transmission apparatus via wireless communication; and acquiring, by an electronic circuit, identification information of the transmission apparatus on the basis of an estimation result of a spreading code used for a received reception signal.

REFERENCE SIGNS LIST 1 transmission apparatus
11 communication unit
12 signal processing unit
121 distribution circuit
122 error correction circuit
123 digital modulator
124 repeater
125 spreading code selector
126 spreader
127 MUX
128 SFD pattern selector
2 reception apparatus
21 communication unit
22 signal processing unit
23 preamble reception unit
24 SFD reception unit
25 sensor information reception unit
26 terminal ID synthesizing unit
240, 250 spreading code synthesizer
2400 spreading code generator
231, 241, 251 despreader
232, 242, 252 spreading code determination unit
233, 243, 253 selection circuit
234, 244, 254 downsampler
235, 245, 255 digital demodulator
236 preamble detector
246 SFD detector
247 SFD pattern correlator
248 SFD pattern determination unit
249 SFD selection circuit
256 error correction circuit

The invention claimed is:

1. A transmission apparatus comprising:
   a communication unit configured to transmit a transmission signal from the transmission apparatus to a reception apparatus via wireless communication; and
   a signal processing unit configured to generate the transmission signal in which transmission information of a sensor, including at least one of a preamble field, a Sync Frame Detect (SFD) field, and a sensor information field, is spread by using a spreading code selected according to identification information of the transmission apparatus, in order to enable the reception apparatus to acquire the identification information on the basis of an estimation result of the spreading code used for the transmission signal, and
   wherein the signal processing unit performs spreading for each of the preamble field, the SFD field, and the sensor information field of the transmission information by using the spreading code selected based on the three pieces of the divided identification information.

2. The transmission apparatus according to claim 1, wherein the signal processing unit divides the identification information based on the number of fields and the transmission information to spread and combine pieces of the divided transmission information by using the spreading code selected for each piece of the divided identification information.

3. The transmission apparatus according to claim 2, wherein, by using another spreading code among a plurality of spreading codes, the signal processing unit further spreads the transmission signal that has already been spread by using one spreading code among the plurality of spreading codes.

4. The transmission apparatus according to claim 2, wherein the signal processing unit divides the identification information in a manner that all pieces of the divided identification information have equal length.

5. The transmission apparatus according to claim 1, wherein the SFD field of the transmission information includes a fixed pattern for each transmission apparatus, and
wherein the signal processing unit selects the pattern according to the identification information, in order to enable the reception apparatus to acquire the identification information on the basis of an estimation result of the pattern.

6. The transmission apparatus according to claim 1, wherein, as the spreading code, the signal processing unit uses at least one of a Gold code, a Walsh code, and a PN code.

7. A reception apparatus comprising:
a communication unit configured to receive a signal transmitted from a transmission apparatus via wireless communication; and
a signal processing unit configured to acquire identification information of the transmission apparatus on the basis of an estimation result of a spreading code used for a reception signal for a sensor received by the communication unit, the reception signal including at least one of a preamble field, a Sync Frame Detect (SFD) field, and a sensor information field, and
wherein the signal processing unit estimates a candidate as the spread code used for the reception signal, the candidate having a highest correlation with the reception signal among candidates for the spreading code, wherein the number of candidates for the spreading code is less than $2^n$, where n is the number of bits of the identification information.

8. The reception apparatus according to claim 7, wherein the signal processing unit acquires the identification information by estimating a plurality of the spreading codes used for the reception signal and by synthesizing sequences corresponding to the estimated spreading codes, wherein the plurality of the spreading codes is based on the number of fields in the reception signal.

9. The reception apparatus according to claim 8, wherein the signal processing unit acquires the identification information on the basis of an estimation result of the SFD field that includes a fixed pattern for each transmission apparatus used for the reception signal.

10. An information processing method comprising:
transmitting a transmission signal from a transmission apparatus to a reception apparatus via wireless communication; and
generating, by an electronic circuit, the transmission signal in which transmission information of a sensor, including at least one of a preamble field, a Sync Frame (SFD) field, and a sensor field, is spread by using a spreading code selected according to identification information of the transmission apparatus, in order to enable the reception apparatus to acquire the identification information on the basis of an estimation result of the spreading code used for the transmission signal, and
wherein the signal processing unit performs spreading for each of the preamble field, the SFD field, and the sensor information field of the transmission information by using the spreading code selected based on the three pieces of the divided identification information.

11. An information processing method comprising:
receiving a signal transmitted from a transmission apparatus via wireless communication; and
acquiring, by an electronic circuit, identification information of the transmission apparatus on the basis of an estimation result of a spreading code used for a received reception signal for a sensor,
wherein the estimation result is a candidate having a highest correlation with the reception signal among candidates for the spreading code,
wherein the number of candidates for the spreading code is less than $2^n$, where n is the number of bits of the identification information.

* * * * *